US007604687B2

(12) United States Patent
Miller et al.

(10) Patent No.: US 7,604,687 B2
(45) Date of Patent: Oct. 20, 2009

(54) GAS FILTRATION MEDIA

(75) Inventors: Eric H. Miller, Philpot, KY (US);
Joseph G. Yaritz, Utica, KY (US); Karl Froelich, Charlotte, NC (US); Mark T. Demeuse, Charlotte, NC (US)

(73) Assignee: Daramic LLC, Charlotte, NC (US)

( * ) Notice: Subject to any disclaimer, the term of this patent is extended or adjusted under 35 U.S.C. 154(b) by 567 days.

(21) Appl. No.: 11/445,357

(22) Filed: Jun. 1, 2006

(65) Prior Publication Data

US 2006/0272499 A1 Dec. 7, 2006

Related U.S. Application Data

(60) Provisional application No. 60/687,620, filed on Jun. 3, 2005.

(51) Int. Cl.
*B01D 46/00* (2006.01)
*B01D 39/16* (2006.01)
*B01D 39/20* (2006.01)

(52) U.S. Cl. .............................. 95/273; 95/285; 55/522; 55/523; 55/524; 55/528; 210/650; 210/503; 210/510.1

(58) Field of Classification Search .................... 95/45, 95/117, 141, 273, 285, 901; 96/11, 13, 14, 96/153, 154; 55/522, 523, 524, 528; 210/650, 210/502.1, 503, 510.1
See application file for complete search history.

(56) References Cited

U.S. PATENT DOCUMENTS

| 3,351,495 | A |   | 11/1967 | Wayne et al. |
| 4,664,683 | A | * | 5/1987 | Degen et al. .................. 55/524 |
| 4,833,172 | A |   | 5/1989 | Schwarz et al. |
| 5,507,847 | A |   | 4/1996 | George et al. |
| 5,527,569 | A | * | 6/1996 | Hobson et al. ................. 55/528 |
| 5,620,669 | A | * | 4/1997 | Plinke et al. ............... 55/385.3 |
| 5,783,086 | A | * | 7/1998 | Scanlon et al. .................... 96/6 |
| 5,928,588 | A | * | 7/1999 | Chen et al. .................... 264/113 |
| 6,059,860 | A | * | 5/2000 | Larson ........................ 95/117 |
| 6,261,979 | B1 | * | 7/2001 | Tanaka et al. .................. 55/521 |
| 6,302,934 | B1 | * | 10/2001 | Nabata et al. .................. 55/528 |
| 6,409,785 | B1 |   | 6/2002 | Smithies et al. |
| 7,112,272 | B2 | * | 9/2006 | Hughes et al. ................. 55/522 |
| 2005/0016917 | A1 | * | 1/2005 | Meng .......................... 210/503 |

* cited by examiner

*Primary Examiner*—Jason M Greene
(74) *Attorney, Agent, or Firm*—Hammer & Associates, P.C.

(57) ABSTRACT

A gas filtration media comprises a microporous membrane. The microporous membrane includes an ultrahigh molecular weight polyethylene (UHMWPE), an inorganic material, wherein the ratio of inorganic material to polymer is in the range of 4:1 to 1:4, and less than 30% by weight of the membrane being a processing oil.

19 Claims, No Drawings ized filtration layer sandwiched
GAS FILTRATION MEDIA

RELATED APPLICATIONS

The instant application is related to co-pending U.S. Provisional Patent Application Ser. No. 60/687,620 filed Jun. 3, 2005.

FIELD OF THE INVENTION

The instant application relates to a gas filtration media, for example an air filtration media.

BACKGROUND OF THE INVENTION

Gas filtration media are known. For example, see U.S. Pat. Nos. 5,507,847 and 6,409,785. U.S. Pat. No. 5,507,847 discloses an ultra-low penetration air (ULPA) filter. This filter includes at least one mircoporous filtration layer sandwiched between one or more layers of an upstream and downstream support material. The microporous layer may be made of, among other things, expanded polytetrafluoroethylene (ePTFE) or ultra high molecular weight polyethylene (UHMWPE). U.S. Pat. No. 6,409,785 discloses a high efficiency particulate air (HEPA)-rated filtration media including a porous primary filtration layer. The porous primary filtration layer is an ePTFE. Additionally, it is known to use ePTFE supported by microglass.

The use of ePTFE in such media, while capable of achieving the needed removal efficiencies, is expensive and is difficult to process because of its lack of mechanical strength.

While, U.S. Pat. No. 5,507,847 mentions that microporous membranes of UHMWPE may be suitable, no such membranes are disclosed. U.S. Pat. Nos. 3,351,495 and 4,833,172 disclose UHMWPE membranes, but these membranes are suggested for different uses, such as a liquid filtration media or a battery separator or a breathable coating for textiles.

Therefore, there is a need for a new gas filtration media based upon UHMWPE membranes.

SUMMARY OF THE INVENTION

A gas filtration media comprises a microporous membrane. The microporous membrane includes an ultrahigh molecular weight polyethylene (UHMWPE), an inorganic material, wherein the ratio of inorganic material to polymer is in the range of 4:1 to 1:4, and less than 30% by weight of the membrane being a processing oil.

DETAILED DESCRIPTION OF THE INVENTION

A gas filtration media, as used herein refers to a filtration media for removal of particulates from a gas, e.g., air. This media is not for use as a liquid filtration media, a battery separator, or a textile garment.

The gas filter media of the instant invention includes an ultrahigh molecular weight polyethylene and an inorganic material. The gas filter media may further include a processing oil (i.e., oil remains in the media after extraction). The gas filter media may further include a thermoplastic polyolefin. Each of these is discussed in greater detail below.

The ultrahigh molecular weight polyethylene (UHMWPE) may constitute any weight percent of the gas filter media. UHMWPE, as used herein, refers to a polyethylene polymer, that, when heated to its melting point, exhibits no flow or virtually no flow (e.g., a melt flow index of 0 or virtually 0). Such polymers typically have molecular weights greater than $5 \times 10^5$. In other embodiments, the molecular weight may be greater that $1 \times 10^6$, or in the range of $5 \times 10^5$ to $7 \times 10^6$, or $1 \times 10^6$ to $7 \times 10^6$.

The inorganic material may be any inorganic material. The inorganic material may be an inert material with respect to the other materials in the media, but may or may not be interactive with the particulates to be filtered. Further, the inorganic material should have processing oil absorption capability, so that more processing oil may be retained in the mixture during processing. For example, the inorganic material may be an inorganic material selected from the group consisting of: carbon based materials (e.g., carbon black, coal dust, graphite, conductive carbon/graphite, absorptive carbon); metal oxides, carbonates, hydroxides, and salts (e.g., metals such as silicon, aluminum, calcium, magnesium, barium, titanium, iron, zinc, tin); minerals (e.g., mica, montmorillonite, kaolin, attapulgite, asbestos, talc, diatomaceous earth, vermiculite); synthetic and natural zeolites; cement (e.g., Portland cement); silicates (e.g., precipitated metal silicates such as calcium silicate and aluminum polysilicate); silicas (e.g., alumina silica gels); wood products (e.g., wood flour, wood fibers, barks); glass particles (e.g., microbeads, hollow microspheres, flakes, fibers); and combinations thereof. Particularly preferred materials include: silicas and titanium dioxide. The inorganic material may constitute any weight percent of the gas filter media.

The ratio of inorganic material to polymer may be in the range of 4:1 to 1:4. In another embodiment, the ratio may be 2:1 to 3:1. In yet another embodiment, the ratio may be 2.5 to 3.0:1.

The processing oil (or pore forming agent) may be any processing oil. The processing oil may be an oil or an ester-based plasticizer. For example, the oil may include, for example, a hydrocarbon oil, e.g., paraffinic oil, napthalenic oil or combinations thereof. The ester-based plasticizer may include, for example, sebacates, phthalates, stearates, adipates, citrates, and combinations thereof. The processing oil may constitute any weight percent of the gas filter media. For example, the processing oil remaining in the media after all extractions may constitute about 0-30% by weight percent of the gas filter media. In another embodiment, the processing oil may constitute less than 20% by weight of the gas filtration media. In yet another embodiment, the processing oil may constitute less than 15% by weight of the gas filtration media.

The thermoplastic polyolefin may constitute any weight percent of the gas filter media. The thermoplastic polyolefin acts as a stretching aid, i.e., it enables the sheet to be stretched without interruption (e.g., breakage). For example, the thermoplastic polyolefin may constitute about less than 2 weight percent of the gas filter media. The thermoplastic polyolefin may be any lower molecular weigh polyolefin. Such lower molecular weight polyolefins include, but are not limited to, polyethylene, polypropylene, polybutene, polypentene, copolymers thereof and combinations thereof. In one embodiment, the thermoplastic polyolefin is low density polyethylene (LDPE), linear low density polyethylene (LLDPE), high density polyethylene (HDPE), or combinations thereof.

The foregoing may also include conventional additives, such as stabilizers and antioxidants and the like as is well known in the art.

The gas filter media may withstand any temperature. For example, the gas filter media may withstand a temperature of at least 165° C. In the alternative, the gas filter media may, for example, withstand a temperature of at least 150° C. for a period of at least 36 hours. The gas filter media may have any Gurley. For example, the gas filter media may have a Gurley in the range of about 0.5 seconds/100 cc to about 25 seconds/100 cc; preferably, about 1 seconds/100 cc to about 5 seconds/100 cc. Moreover, Gurley is indicative of pressure drop through the membrane; thus, lower Gurley is indicative of lower pressure drop. The gas filter media may have any thickness. For example, the gas filter media may have a thickness in the range of about 1 (25 microns) to about 5 mil (125 microns); preferably, about 1 (25 microns) to about 2 mil (50 microns). The gas filter media may have any porosity. For example, the gas filter media may have a porosity in the range of about 60 to about 95 percent. The gas filter media may have any average pore size. For example, the gas filter media may have an average pore size of about 0.4 to about 10 microns.

The gas filter media may be used as a filter media for any end-use applications. For example, the gas filter media may be used as a filter media for an end-use application selected from the group consisting of particulate removal from gases, air-filtration application, elevated temperature application, baghouse application, particulate filtration in food and pharmaceuticals, particulate filtration in combustion process, particulate filtration in metals, and particulate filtration in cements. Particulate removal from gases includes industries such as HVAC, HEPA and ULPA clean rooms, vacuum cleaning, respirators, cement, metals, food, pharmaceuticals, processed fluids, and combustion processes.

The gas filter media may stand alone as a filter media; or in the alternative, it may be joined with (e.g., laminated to or bonded to) a support material, for example, a non-woven material or a fabric. Exemplary lamination or bonding techniques include such conventional methods as, but not limited to, adhesives, welding (heat/ultrasonics) and the like. Furthermore, the gas filter media may be flat or formed into pleats or shapes.

Any conventional method may be used to make the gas filter media of the instant invention. The process of making the gas filter media may be initiated with mixing the inorganic material and the ultrahigh molecular weight polyethylene. The ratio of inorganic material to polymer may be in the ratio of 4:1 to 1:4. The mixture, then, may be compounded with a processing oil thereby forming a compound. The processing oil may constitute about 50 to about 85 weight percent of the compound. The compound is extruded into a film (or sheet), and the major portion (e.g., 3-25% by weight of the membrane remaining in the sheet for stretching) of the processing oil is extracted from the film. Subsequently, the film is stretched about 1.5 times to about 15 times the original film dimension at a temperature in the range of about 80° C. to about 170° C. thereby imparting additional porosity upon the film. The film may be stretched in a uniaxial direction or a biaxial direction (e.g., simultaneously or sequentially). Finally, a major portion (<30% by weight of the membrane after the final extraction) of the remaining processing oil may be extracted from the stretched film via conventional methods.

EXAMPLES

The instant invention is further illustrated by the following examples. Percent (%) is percent (%) by weight of the membrane. Gurley is expressed in sec/100 cc and is measured according to TAPPI T-460 om-02. In Table 1, the formulations are set forth. Each formulation contains less than 2% by weight of the membrane of the thermoplastic polyolefin. PE is the UHMWPE (GUR 4152 from Ticona, Lexington Ky.). Si is the inorganic material (WB-10 silica from PPG, Pittsburgh, Pa.). In Table 2, the influence of varying processing parameters upon Gurley is illustrated. For example, formulations A & B demonstrate the influence of membrane pre-heating upon Gurley. Formulation C demonstrates the influence of the amount of process oil during extrusion upon Gurley. Formulation D demonstrates that the amount of stretch has no influence upon Gurley. Formulation E demonstrates the influence of casting versus calendering upon Gurley. When the sheet is cast, there is no calendering; but when calendered the sheet is first cast and then calendered. Table 3 demonstrates the influence that percent (%) oil during sheet formation (i.e., the amount of pore former in the sheet during extrusion) has upon Gurley.

TABLE 1

| Sample | % Oil in Extruded sheet | Si:PE |
|---|---|---|
| A | 72 | 3.0:1 |
| B | 71 | 2.0:1 |
| C | 72 | 3.0:1 |
| C' | 75 | 3.0:1 |
| D | 75 | 3.0:1 |
| E | 75 | 3.0:1 |

TABLE 2

| Sample # | % oil in Extruded Sheet | Cast roll Temp F. | Ratio Si:PE | Oil %[1] | MD | TD | Relax | Biaxial Area | Avg initial thickness (mils) | Avg Gurley (sec/100 cc) | Pore size (microns) |
|---|---|---|---|---|---|---|---|---|---|---|---|
| A | 72% | 160 | 3.0:1 | 14 | 2.5 | 3.3 | 2.5% | 8.25 | 9.5 | 12.6 | 0.29 |
| A | 72% | 160 | 3.0:1 | 14 | 2.5 | 3.3 | 2.5% | 8.25 | 9.5 | 9.1 | 0.43 |
| B | 71% | 160 | 2.0:1 | 20 | 2.5 | 3.3 | 2.5% | 8.25 | 10.5 | 10.8 | 0.27 |
| B | 71% | 160 | 2.0:1 | 20 | 2.5 | 3.3 | 2.5% | 8.25 | 10.5 | 5.3 | 0.42 |
| C | 72% | 160 | 3.0:1 | 14 | 2.5 | 4.0 | 2.5% | 10.00 | 9.5 | 6.9 | |
| C' | 75% | 160 | 3.0:1 | 14 | 2.5 | 4.0 | 2.5% | 10.00 | 9.5 | 2.5 | |
| D* | 75% | 160 | 3.0:1 | 14 | 2.5 | 3.3 | 2.5% | 8.25 | 10.0 | 7.64 | |
| D* | 75% | 160 | 3.0:1 | 14 | 4.0 | 5.0 | 2.5% | 20.00 | 10.0 | 7.7 | |
| E | 75% | 160 | 3.0:1 | 14 | 2.5 | 3.3 | 2.5% | 8.25 | 11.0 | 2.6 | 0.46 |
| E* | 75% | 160 | 3.0:1 | 14 | 2.5 | 3.3 | 2.5% | 8.25 | 10.0 | 7.64 | |

| Sample # | Speed in (fpm) | Speed out (fpm) | MD Preheat (F.) | MD Stretch (F.) | Anneal temp (F.) | Cool Temp (F.) | Pre-heat (F.) | Biaxial temp (F.) | Relax % Zone 3 | Temp Zone 3 (F.) |
|---|---|---|---|---|---|---|---|---|---|---|
| A | 10 | 25 | 275 | 280 | 285 | 150 | 295.0 | 285.0 | 2.5% | 285.0 |
| A | 10 | 25 | 275 | 280 | 285 | 150 | 300.0 | 285.0 | 2.5% | 285.0 |
| B | 10 | 25 | 275 | 280 | 285 | 150 | 305.0 | 295.0 | 2.5% | 280.0 |
| B | 10 | 25 | 275 | 280 | 285 | 150 | 310.0 | 290.0 | 2.5% | 280.0 |
| C | 10 | 25 | 275 | 280 | 285 | 150 | 300.0 | 300.0 | 2.5% | 290.0 |
| C' | 10 | 25 | 275 | 280 | 285 | 150 | 300.0 | 295.0 | 2.5% | 290.0 |
| D* | 10 | 25 | 275 | 280 | 285 | 150 | 300.0 | 285.0 | 2.5% | 280.0 |

TABLE 2-continued

| | | | | | | | | | | |
|---|---|---|---|---|---|---|---|---|---|---|
| D* | 10 | 40 | 275 | 280 | 285 | 150 | 300.0 | 285.0 | 2.5% | 285.0 |
| E  | 10 | 25 | 275 | 280 | 285 | 150 | 300.0 | 290.0 | 2.5% | 285.0 |
| E* | 10 | 25 | 275 | 280 | 285 | 150 | 300.0 | 285.0 | 2.5% | 280.0 |

*- calendered after casting of sheet.
[1]-% oil remaining after 1st extraction

TABLE 3

| Sample | Gurley sec/100 cc | % Pore forming agent (oil) |
|---|---|---|
| 1 | 32.8 | 72 |
| 2 | 25.5 | 77 |

TABLE 4

| Filter | Port | Grimm 0.05μ | Particles/2 ft3 at: (in microns) | | | | | | |
|---|---|---|---|---|---|---|---|---|---|
| | | | 0.07-0.1 | 0.1-0.15 | 0.15-0.2 | 0.2-0.3 | 0.2-0.5 | 0.5-0.7 | 0.7-1.0 |
| Microglass | Upstream | 122,857 | 2,628,480 | 5,777,280 | 3,178,620 | 3,685,860 | 3,090,060 | 70,380 | 59820 |
| | Downstream | 4 | 172 | 494 | 245 | 53 | 3 | 0 | 1 |
| | Efficiency | 99.997 | 99.9935 | 99.9914 | 99.9923 | 99.999 | >99.999 | >99.99 | >99.99 |
| 114PB025 | Upstream | 117,779 | 1,817,520 | 4,291,200 | 2,548,500 | 3,071,040 | 2,287,320 | 414,180 | 65,700 |
| | Downstream | 1 | 1 | 11 | 15 | 6 | 0 | 0 | 0 |
| | Efficiency | 99.999 | 99.9999 | 99.9997 | 99.9994 | 99.9998 | >99.999 | >99.99 | >99.99 |
| D114 | Upstream | 123,629 | 1,783,800 | 4,112,640 | 2,556,660 | 3,094,860 | 2,265,480 | 357,660 | 73,380 |
| | Downstream | 1 | 8 | 32 | 8 | 5 | 1 | 1 | 0 |
| | Efficiency | 99.999 | 99.9996 | 99.9992 | 99.9997 | 99.9998 | >99.999 | >99.99 | >99.99 |
| D-41 | Upstream | 125,031 | 2,796,780 | 5,996,280 | 3,589,860 | 4,210,620 | 2,665,740 | 269,160 | |
| | Downstream | 2 | 113 | 457 | 395 | 65 | 28 | 2 | |
| | Efficiency | 99.998 | 99.9960 | 99.9924 | 99.9890 | 99.9985 | 99.999 | >99.999 | |
| D-39 | Upstream | 113,933 | 2,842,800 | 6,019,440 | 3,629,340 | 4,103,880 | 2,747,340 | 282,300 | |
| | Downstream | 4 | 88 | 262 | 109 | 18 | 5 | 1 | |
| | Efficiency | 99.997 | 99.9969 | 99.9956 | 99.9970 | 99.9996 | 99.9998 | >99.999 | |
| D-38 | Upstream | 136,772 | 2,800,680 | 6,017,820 | 3,634,920 | 4,142,760 | 2,737,980 | 317,640 | |
| | Downstream | 2 | 54 | 122 | 108 | 37 | 9 | 1 | |
| | Efficiency | 99.999 | 99.9981 | 99.9980 | 99.9970 | 99.9991 | 99.9997 | >99.999 | |

TABLE 3-continued

| Sample | Gurley sec/100 cc | % Pore forming agent (oil) |
|---|---|---|
| 3 | 25.7 | 82 |
| 4 | 22.3 | 84 |
| 5 | 15.9 | 86 |
| 6 | 10.9 | 88 |
| 7 | 9.4 | 90 |

In Tables 4 and 5, the fractional retention efficiency of various membranes are compared. The fractional retention efficiency tests were conducted according to EN 1822.

In Table 4, a microglass filtration media, named DURAPORE and sold by Millipore of Billerica, Mass., is compared to five inventive media. Sample 114PB025 is a laminate of a film of the present invention to a nonwoven material. Samples D114, D4, D39, and D-38 are unlaminated base films of the present invention. These tests were conducted under the following conditions: Fluid—air; Instrimentation 0.05 micron—Grimm DMA/Ultrafine; Instrumentation 0.07-1 micron—PMS LPC 0710; Face velocity—5 fpm; Temperature—72° F.; Containant—KCl, neutralized; Description of sample—flat sheet media cut to 90 mm disks.

In Table 5, a microglass filtration media, named DURAPORE and sold by Millipore of Billerica, Mass., is compared to three inventive media. FP04B040 is a white microporous ePTFE membrane laminated to a nonwoven. DA28PB041 is a white microporous ultrahigh molecular weight polyethylene membrane filled with silica laminated to nonwoven, Gurley=3 seconds/100 cc. DA28PB042 is a white microporous ultrahigh molecular weight polyethylene membrane filled with silica laminated to nonwoven, Gurley=2.5 seconds/100 cc. These test were conducted under the following conditions: Fluid—air; Instrumentation 0.05 micron—Grimm DMA/UPC; Instrumentation 0.07-1 micron—PMS Lasair model 110; Face velocity—5 fpm; Temperature—71° F.; relative humidity—41%; barometric Pressure—740 mm Hg; Contaminant—paraffin oil aerosol; Description of sample—flat sheet media cut to 90 mm disks.

TABLE 5

| Filter | Net DP mm of H20 | Port | 0.05 | 0.07 | Particles/2 ft3 at: (in microns) | | | | | |
|---|---|---|---|---|---|---|---|---|---|---|
| | | | | | 0.1-0.15 | 0.15-0.2 | 0.2-0.25 | 0.25-0.3 | 0.3-0.5 | 0.5-0.7 |
| Microglass | 18.0 | Upstream | 1292040 | 1278120 | 3833400 | 3573600 | 1400040 | 680220 | 865920 | 59820 |
| | | Downstream | 5 | 7 | 29 | 22 | 3 | 1 | 0 | 0 |
| | | Efficiency | 99.9996 | 99.9995 | 99.9992 | 99.9994 | 99.9998 | 99.9999 | >99.999 | >99.999 |
| FPO4PB040 | 36.0 | Upstream | 1283580 | 1266180 | 3839700 | 3581640 | 1401300 | 678240 | 855720 | 59640 |
| | | Downstream | 31 | 104 | 179 | 36 | 8 | 2 | 0 | 0 |
| | | Efficiency | 99.9976 | 99.9918 | 99.9953 | 99.9990 | 99.9994 | 99.9997 | >99.999 | >99.999 |
| DA28PB041 | 53.0 | Upstream | 1276380 | 1297500 | 3893520 | 3557640 | 1395780 | 686340 | 854100 | 57900 |
| | | Downstream | 13 | 23 | 112 | 35 | 7 | 3 | 0 | 0 |
| | | Efficiency | 99.9990 | 99.9982 | 99.9971 | 99.9990 | 99.9995 | 99.9996 | >99.999 | >99.999 |
| DA28PB042 | 60.0 | Upstream | 1266780 | 1302540 | 3874320 | 3572400 | 1382820 | 681540 | 838860 | 55920 |
| | | Downstream | 26 | 123 | 201 | 47 | 10 | 1 | 0 | 0 |
| | | Efficiency | 99.9979 | 99.9906 | 99.9948 | 99.9987 | 99.9993 | 99.9999 | >99.999 | >99.999 |

The present invention may be embodied in other forms without departing from the spirit and the essential attributes thereof, and, accordingly, reference should be made to the appended claims, rather than to the foregoing specification, as indicated the scope of the invention.

We claim:

1. A method of filtering particulates from a gas comprising the step of:
   providing a filtration media comprising a microporous membrane, the membrane including an ultra high molecular weight polyethylene, an inorganic material, wherein the ration of inorganic material to polymer being in the range of 4:1 to 1:4, and a processing oil being no more than 30% by weight of said membrane.

2. The method of claim 1 wherein the media having a Gurley of less than 25 sec/100 cc.

3. The method of claim 1 wherein the media being adapted to withstand a constant operating temperature of at least 150° C. for a period of at least 36 hours.

4. The method of claim 1 wherein the media being adapted to withstand an operating temperature of at least 165° C.

5. The method of claim 1 wherein the ultra high molecular weight polyethylene having a molecular weight of at least $5 \times 10^5$.

6. The method of claim 1 wherein the ultra high molecular weight polyethylene having a molecular weight in the range of $1 \times 10^6 - 7 \times 10^6$.

7. The method of claim 1 wherein the inorganic material being an inert material.

8. The method of claim 1 wherein the inorganic material being selected from the group consisting of: carbon based materials; metal oxides, carbonates, hydroxides, and salts; minerals; synthetic and natural zeolites; cement; silicates; silicas; wood products; glass particles; and combinations thereof.

9. The method of claim 1 wherein the processing oil comprising oils and/or ester-based plasticizers.

10. The method of claim 1 wherein the media further comprises 2% or less by weight of the membrane of a thermoplastic polyolefin.

11. A gas filtration media comprising:
    a microporous membrane, the membrane including
       an ultra high molecular weight polyethylene
       an inorganic material
    wherein a ratio of inorganic material to polymer being in the range of 4:1 to 1:4
       a processing oil being no more than 30% by weight of said membrane and
       less than 2% by weight of said membrane of a thermoplastic polyolefin.

12. The gas filtration media of claim 11 wherein the media having a Gurley of less than 25 sec/100 cc.

13. The gas filtration media of claim 11 wherein the media being adapted to withstand a constant operating temperature of at least 150° C. for a period of at least 36 hours.

14. The gas filtration media of claim 11 wherein the media being adapted to withstand an operating temperature of at least 165° C.

15. The gas filtration media of claim 11 wherein the ultra high molecular weight polyethylene having a molecular weight of at least $5 \times 10^5$.

16. The gas filtration media of claim 11 wherein the inorganic material being an inert material.

17. The gas filtration media of claim 11 wherein the inorganic material being selected from the group consisting of: carbon based materials; metal oxides, carbonates, hydroxides, and salts; minerals; synthetic and natural zeolites; cement; silicates; silicas; wood products; glass particles; and combinations thereof.

18. The gas filtration media of claim 11 wherein the processing oil comprising oils and/or ester-based plasticizers.

19. The gas filtration media of claim 11 further comprising a support material joined thereto.

* * * * *